(12) United States Patent
Tanaka

(10) Patent No.: US 9,531,949 B2
(45) Date of Patent: Dec. 27, 2016

(54) MOBILE TERMINAL AND INEFFECTIVE REGION SETTING METHOD

(71) Applicant: KYOCERA Corporation, Kyoto-shi, Kyoto (JP)

(72) Inventor: Ken Tanaka, Daito (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/802,912

(22) Filed: Jul. 17, 2015

(65) Prior Publication Data

US 2015/0326779 A1 Nov. 12, 2015

Related U.S. Application Data

(62) Division of application No. 14/114,169, filed as application No. PCT/JP2012/059969 on Apr. 12, 2012, now Pat. No. 9,106,828.

(30) Foreign Application Priority Data

Apr. 26, 2011 (JP) .................................. 2011-097918

(51) Int. Cl.
| | |
|---|---|
| *H04N 5/232* | (2006.01) |
| *G06F 3/0481* | (2013.01) |
| *G06F 3/0484* | (2013.01) |
| *G06F 3/0488* | (2013.01) |
| *H04M 1/725* | (2006.01) |
| *H04N 1/00* | (2006.01) |
| *H04N 101/00* | (2006.01) |

(52) U.S. Cl.
CPC ...... *H04N 5/23216* (2013.01); *G06F 3/04812* (2013.01); *G06F 3/04842* (2013.01);
(Continued)

(58) Field of Classification Search
CPC .................................................. H04N 5/23293
(Continued)

(56) References Cited

U.S. PATENT DOCUMENTS

| | | | |
|---|---|---|---|
| 2009/0184935 A1 | 7/2009 | Kim | |
| 2009/0264157 A1* | 10/2009 | Hsieh | G06F 3/0488 455/566 |

(Continued)

FOREIGN PATENT DOCUMENTS

| | | |
|---|---|---|
| JP | 2007-028536 A | 2/2007 |
| JP | 2008-199145 A | 8/2008 |

(Continued)

OTHER PUBLICATIONS

Office Action dated Oct. 21, 2014 issued for counterpart Japanese application No. 2011-097918.

(Continued)

*Primary Examiner* — Anthony J Daniels
(74) *Attorney, Agent, or Firm* — Procopio Cory Hargreaves and Savitch LLP

(57) ABSTRACT

[Structure] A mobile phone 10 includes a camera control circuit 40 to which an image sensor 42, etc. are connected. If and when a camera function is performed, a through image is displayed on a display 30 on which a touch panel 38 is provided. At a time that the through image is being displayed, if and when a touch operation for designating a region after a touch operation is performed onto a setting key 70, an ineffective region 74 is set within a touch range of the touch panel 38. An imaging key 64 and a cancel key 72 are displayed in the effective region within the touch range excepting the ineffective region.

9 Claims, 14 Drawing Sheets

(52) U.S. Cl.
CPC .... *G06F 3/04886* (2013.01); *H04M 1/72522* (2013.01); *H04N 5/23222* (2013.01); *H04N 5/23293* (2013.01); *G06F 2203/04803* (2013.01); *H04M 2250/22* (2013.01); *H04M 2250/52* (2013.01); *H04N 1/0044* (2013.01); *H04N 1/00307* (2013.01); *H04N 1/00411* (2013.01); *H04N 2101/00* (2013.01); *H04N 2201/0084* (2013.01)

(58) Field of Classification Search
USPC .................................... 348/333.01, 333.02
See application file for complete search history.

(56) References Cited

U.S. PATENT DOCUMENTS

| | | | |
|---|---|---|---|
| 2010/0020222 A1* | 1/2010 | Jones | G06F 3/04883 348/333.02 |
| 2011/0019239 A1 | 1/2011 | Kojima et al. | |
| 2011/0102357 A1 | 5/2011 | Kajitani | |
| 2011/0221948 A1 | 9/2011 | Saito | |
| 2011/0285645 A1 | 11/2011 | Cho et al. | |
| 2012/0166833 A1 | 6/2012 | Iwai et al. | |

FOREIGN PATENT DOCUMENTS

| | | |
|---|---|---|
| JP | 2009-080683 A | 4/2009 |
| JP | 2010-009335 A | 1/2010 |
| JP | 2010-020608 A | 1/2010 |
| JP | 2010-062706 A | 3/2010 |
| JP | 2011-050038 A | 3/2011 |
| WO | 2010-064095 A1 | 6/2010 |

OTHER PUBLICATIONS

International Search Report dated Jul. 10, 2012, issued for International Application No. PCT/JP2012/059969.

Office Action dated Mar. 29, 2016 issued by the Japan Patent Office in counterpart Japanese Application No. 2015-091521.

* cited by examiner

FIG. 4
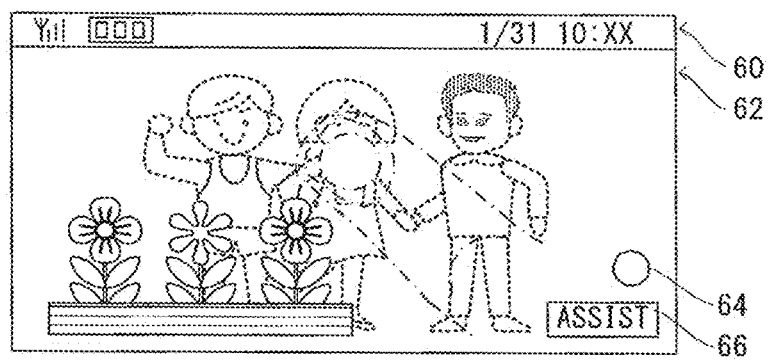
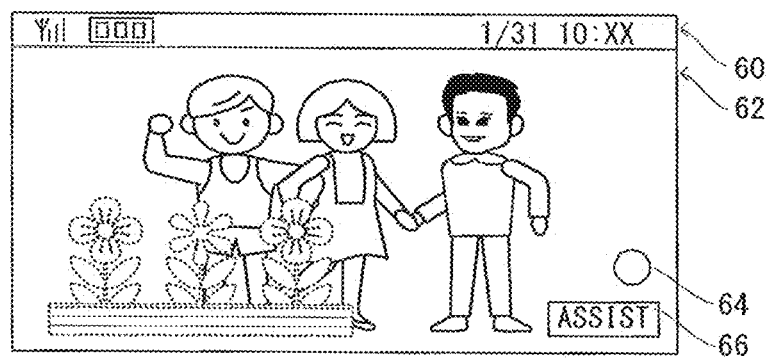

FIG. 5
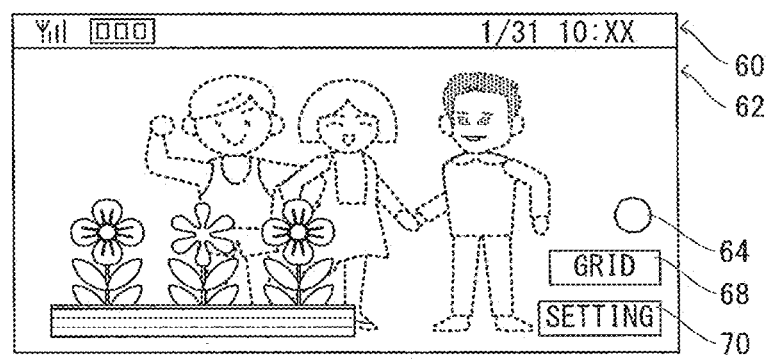
(A)
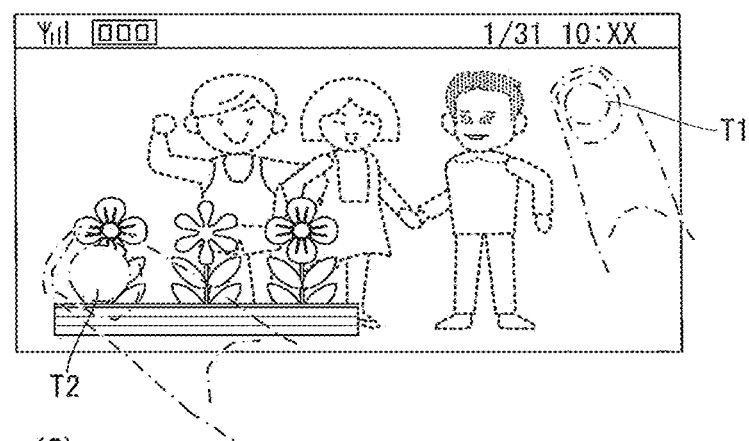
(B)
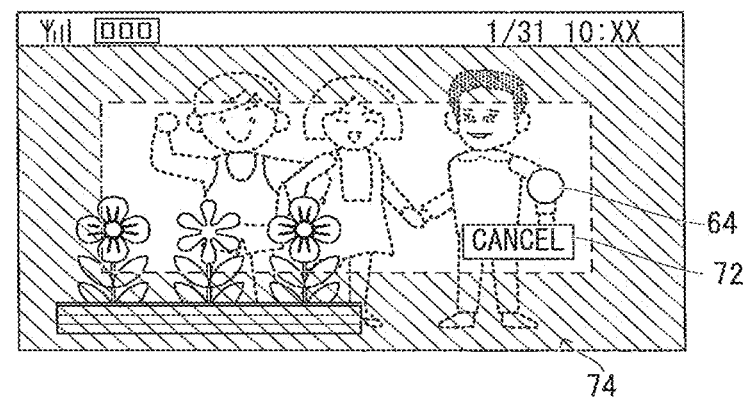
(C)

FIG. 10
(A)
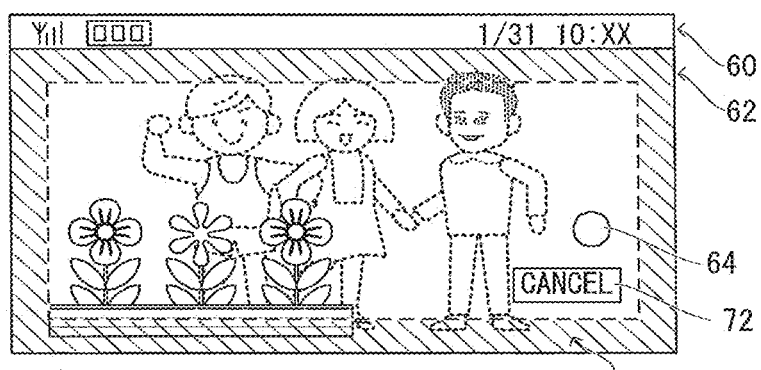
(B)
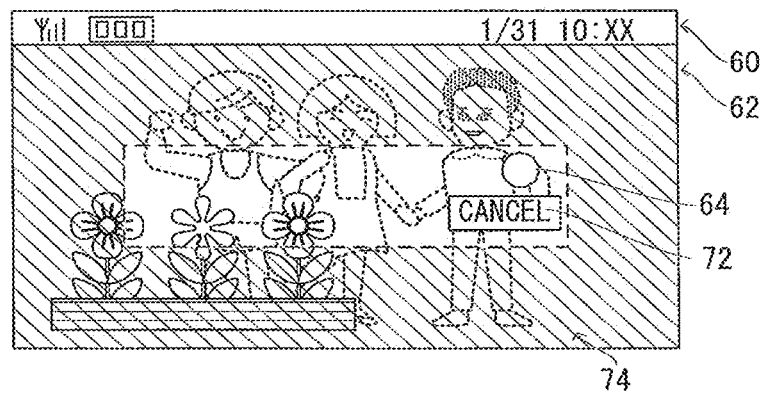

FIG. 13
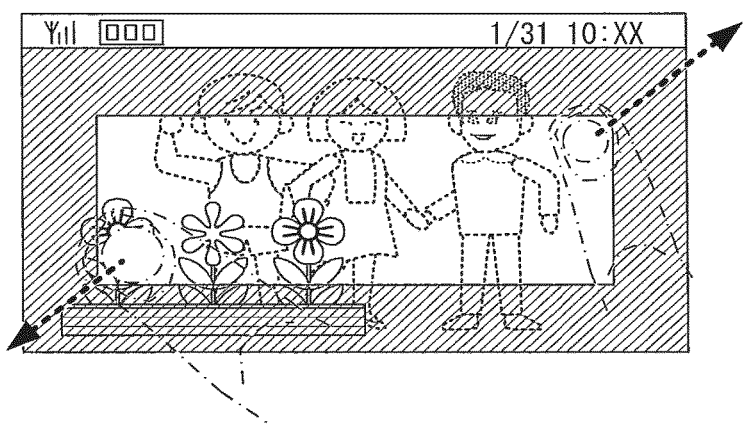
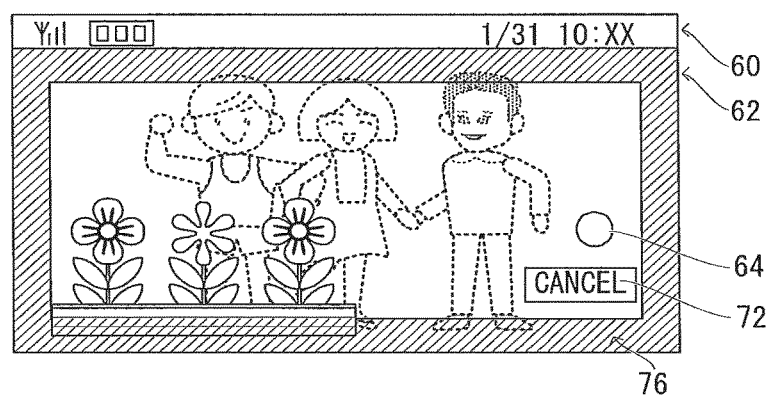

FIG. 16
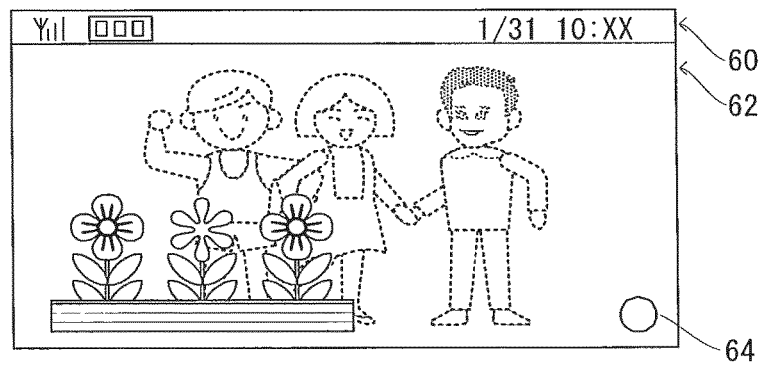
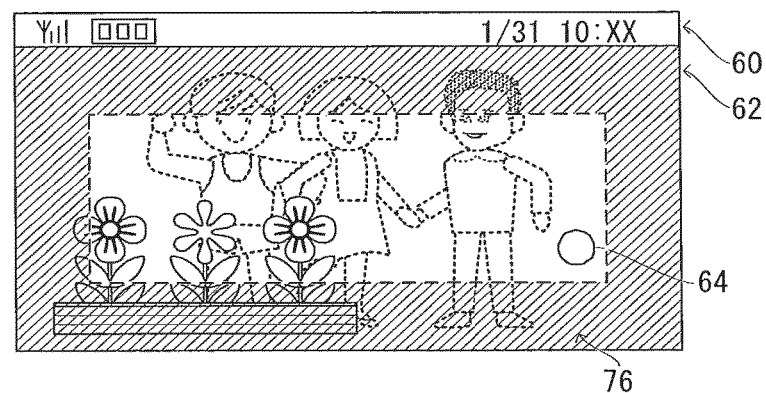
FIG. 17
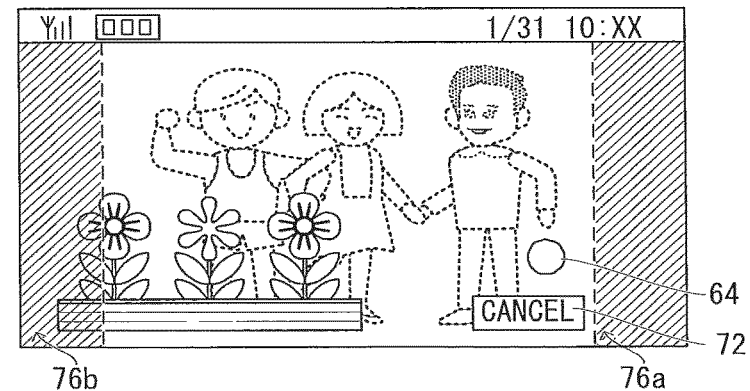

MOBILE TERMINAL AND INEFFECTIVE REGION SETTING METHOD

CROSS REFERENCE TO RELATED APPLICATIONS

The present application is a divisional of U.S. application Ser. No. 14/114,169, filed on Oct. 25, 2013, which claims the benefit of PCT Application No. PCT/JP2012/059969 filed on Apr. 12, 2012, which claims the benefit of Japanese Application No. 2011-097918, filed on Apr. 26, 2011. The contents of the above applications are incorporated by reference herein in their entirety.

FIELD OF ART

The present invention relates to a mobile terminal and an ineffective region setting method, and more specifically, a mobile terminal capable of imaging an image and an ineffective region setting method.

BACKGROUND ART

An example of a mobile terminal capable of imaging an image is disclosed in Patent Literature 1. In a digital camera in Patent Literature 1, when a signal is input from a touch sensor, a displaying area for an imaged image is set so as to avoid a touch position being detected, and in the displaying area, the imaged image, a through image and so on are displayed.

Patent Literature 1: Japanese Patent Application Laying-open No. 2007-28536 [H04N 5/225, H04N 101/00]

SUMMARY OF THE INVENTION

Problem to be Solved by the Invention

However, in a case where the displaying area of the imaged image is set so as to avoid the touch position in the digital camera in Patent Literature 1, a portion of the through image and so on is cut-out or reduced, and accordingly, it becomes difficult for a user to see the imaged image, the through image, etc.

Therefore, it is a primary object of the invention to provide a novel mobile terminal and ineffective region setting method.

It is another object of the invention to provide a mobile terminal and an ineffective region setting method, capable of increasing a visibility of a through image even if an ineffective region is set.

Means for Solving the Problem

The present invention employs following features in order to solve the above-described problems. It should be noted that reference numerals and the supplements inside the parentheses show one example of a corresponding relationship with the embodiments described later for easy understanding of the present invention, and do not limit the present invention.

A first aspect of the invention is a mobile terminal which comprises a camera module operable to output an image of an object; a display that displays an image that is output by the camera module; a touch panel provided on the display; a detecting module operable to detect a touch operation within a touch range on the touch panel; and a performing module operable to perform a predetermined process associated with imaging if and when the touch operation is detected by the detecting module, comprising: a setting module operable to set, inside the touch range, an ineffective region that makes the touch operation ineffective.

In the first aspect according to the invention, the mobile terminal (10: a reference numeral exemplifying a corresponding module in the embodiment, and so forth) comprises the camera module (40-44), and the camera module includes an image sensor (42), etc., and outputs an image of the object that is obtained by the image sensor. The display (30) displays a through image which is based on the image that the camera module outputs, for example. Furthermore, on the display, there is provided with the touch panel that is colorless and transparent such that a displaying content can be sighted. The detecting module detects a touch operation performed within the touch range of the touch panel. If and when the touch operation is performed, the performing module (24, S17) performs the predetermined process associated with the imaging such as a focus process, an imaging process, etc. Then, the setting module (24, S49) sets an ineffective region (74, 76) such that the ineffective region surrounds a periphery of an effective region within the touch range, for example.

According to the first aspect, in a case where the ineffective region is not displayed, since an image can be displayed with no change in its size, it is possible to prevent a visibility of the image being displayed on the display from getting worse.

A second aspect of the invention is an ineffective region setting method in a mobile terminal (10) which comprises a camera module (40-44) operable to output an image of an object; a display (30) displaying an image that is output by the camera module; a touch panel (38) provided on the display; a detecting module (36) operable to detect a touch operation within a touch range on the touch panel; and a performing module (S17) operable to perform a predetermined process associated with imaging if and when the touch operation is detected by the detecting module, comprising a step of: setting (S49), inside the touch range, an ineffective region (74, 76) that makes the touch operation ineffective.

According to the second aspect, in a case where the ineffective region is not displayed, since a through image can be displayed with no change in its size, it is also possible to prevent a visibility of the image displayed on the display from getting worse.

Advantages of the Invention

According to the present invention, in a case where the ineffective region is not displayed, since a through image can be displayed with no change in its size, it is also possible to prevent a visibility of the image displayed on the display from getting worse.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a view showing another example of a through image in the first embodiment displayed on a display shown in FIG. 1.

FIG. 5 is a view showing the other example of a through image in the first embodiment displayed on a display shown in FIG. 1.

FIG. 10 is a view showing an example of a through image in a second embodiment displayed on the display shown in FIG. 1.

FIG. 13 is a view showing another example of a through image in the third embodiment displayed on the display shown in FIG. 1.

FIG. 16 is a view showing an example of a through image in a fourth embodiment displayed on the display shown in FIG. 1.

FIG. 17 is a view showing an example of a through image in a fifth embodiment displayed on the display shown in FIG. 1.

FORMS FOR EMBODYING THE INVENTION

First Embodiment

Figure 1:
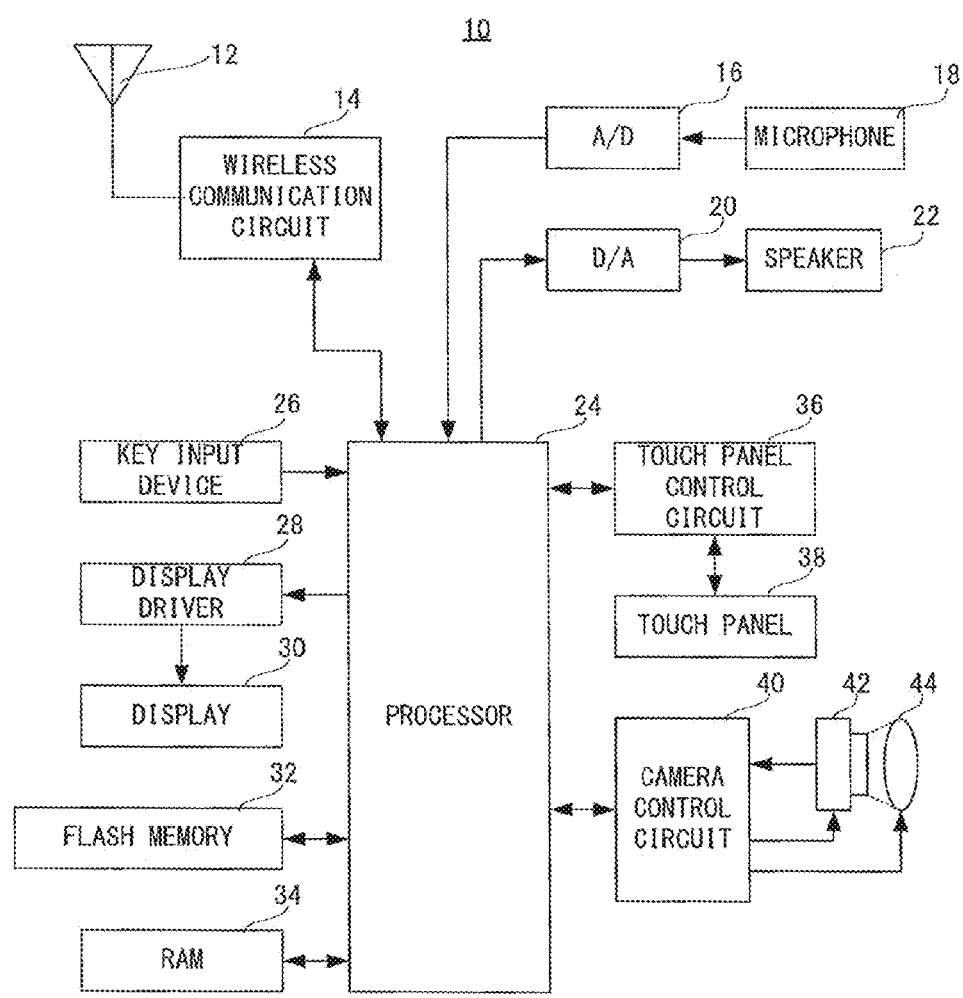
FIG. 1 is a view showing electrical structure of a mobile phone of an embodiment in accordance with the present invention.

With referring to FIG. 1, a mobile phone 10 is a kind of a mobile communication terminal, and includes a processor 24 called as a computer or CPU. The processor 24 is connected with a wireless communication circuit or module 14, an A/D converter 16, a D/A converter 20, a key input device 26, a display driver 28, a flash memory 32, a RAM 34, a touch panel control circuit or module 36, a camera control circuit or module 40, etc.

An antenna 12 is connected to the wireless communication circuit 14. The A/D converter 16 is connected with a microphone 18 and the D/A converter 20 is connected with a speaker 22. A display 30 is connected to the display driver 28. A touch panel 38 is connected to the touch panel control circuit 36. Then, the camera control circuit 40 is connected with an image sensor 42 and a focus lens 44.

The processor 24 is in charge of a whole control of the mobile phone 10. The RAM 34 is used as a working area (including an image drawing area) and a buffer area for the processor 24. Data of contents such as characters, images or videos, voices, sounds, etc. of the mobile phone 10 is recorded in the flash memory 32.

The A/D converter 16 converts an analog sound signal of the voice or sound input through the microphone 18 which is connected to this A/D converter 16 into a digital sound signal. The D/A converter 20 converts (decodes) the digital sound signal into an analog sound signal and applies the analog sound signal to the speaker 22 via an amplifier not shown. Therefore, a voice or sound corresponding to the analog sound signal is output from the speaker 22. The processor 24 can adjust a volume of the voice output from the speaker 22.

The key input device 26 is called as an operating module or portion and includes a call key 26a, a menu key 26b, an end key 26c, etc. Information (key data) of the key that is operated by the user is input to the processor 24. In addition, if and when a key included in the key input device 26 is operated, a click sounds. Accordingly, it is possible for a user to obtain an operational feeling to a key operation by hearing the click.

The display driver 28 controls the displaying of the display 30 connected to this display driver 28 under instructions by the processor 24. In addition, the display driver 28 includes a video memory (not shown) which temporarily stores image data to be displayed. In addition, the display 30 may be called as a display portion or module.

The touch panel 38 is of an electrostatic capacitance system which detects a change of an electrostatic capacitance between electrodes, which occurs when an object such as a finger is in close to a surface of the touch panel, and detects that one or more fingers are brought into contact with the touch panel 38, for example. In addition, the touch panel 38 is provided on the display 30 and functions as a pointing device that designates an arbitrary position(s) within a screen of the display. The touch panel control circuit 36 which functions as a detecting portion or module that detects a touch operation such as pushing, stroking, or contacting within the touch range of the touch panel 38, and outputs coordinates data indicative of a position of the touch operation to the processor 24. That is, the user can input an operating direction, a figure, etc. to the mobile phone 10 by pushing, stroking or contacting to the surface of the touch panel 38 with his/her finger.

Here, an operation that a user touches with his/her finger an upper surface of the touch panel 38 is called as "touch". On the other hand, an operation that the user releases the finger from the touch panel 38 is called as "release". An operation that the user strokes the surface of the touch panel 38 is called as "slide", and an operation that the user touches and slides the surface of the touch panel 38 and then releases the touch is called as "touch slide". Furthermore, an operation that the user touches the touch panel 38 and successively releases is called as "touch and release". The term "touch operation" includes an operation performed against the touch panel 38 such as touch, release, slide, touch slide, touch and release, etc.

In addition, coordinates indicated by the touch are called as "touch point" (a touch start position), and coordinates indicated by the release are called as "release point" (a touch end position).

In addition, a touch operation is not limited to an operation by a finger, may be performed by a touch pen that an electric conductor is attached at a tip end thereof, or the like. Furthermore, for a detection system of the touch panel 38, a surface-type electrostatic capacitance system may be adopted, or a resistance film system, an ultrasonic system, an infrared ray system, an electromagnetic induction system or the like may be adopted.

The camera control circuit 40 is a circuit for imaging a still image or a moving image by the mobile phone 10. If and when an operation for implementing a camera function is performed to the key input device 26, the processor 24 enables the camera control circuit 40 to perform the camera function. In addition, the camera control circuit 40, the image sensor 42 and the focus lens 44 collectively function as a camera module.

In an imaging area of the image sensor 42, photo-receiving elements corresponding to SXGA (1280×1024 pixels) are formed. Therefore, if and when an optical image of an object is irradiated onto the image sensor 42, for example, due to the photoelectric conversion in the imaging area, charges corresponding to an optical image of the object, that is, a raw image signal of SXGA is produced. In addition, the user can change the size (the number of the pixels) of the image data to XGA (1024×768 pixels), VGA (640×480 pixels), etc. other than SXGA.

If and when the camera function is performed, in order to display a real time moving image of the object, i.e. a through image (a preview image) on the display 30, the processor 24 activates an image sensor driver incorporated within the camera control circuit 40, and instructs the image sensor driver to make an exposure operation and a read operation of the charges corresponding to a designated read area.

The image sensor driver performs an exposure on an imaging surface of the image sensor 42, and a read-out of the charges produced by the exposure. As a result, a raw image signal is output from the image sensor 42. The raw image signal that is output is input to the camera control circuit 40 which conducts to the input raw image signal the processing of color separation, white balance adjustment, YUV conversion and so on, thereby to produce image data of YUV format, which is then input to the processor 24.

The image data of YUV format that is input to the processor 24 is saved (temporarily stored) in the RAM 34 by the processor 24. Furthermore, the image data of the YUV format being saved is converted by the processor 24 into RGB data, and then, applied to the display driver 28 from the RAM 34. The image data of the RGB format is then output to the display 30, whereby a low resolution (320×240 pixels, for example) through image representing an object is displayed on the display 30.

Furthermore, the camera control circuit 40 calculates a focus evaluation value from the raw image signal, and outputs the focus evaluation value to the processor 24. The processor 24 performs an AF (autofocus) process based on the focus evaluation value that is output from the camera control circuit 40. If and when the AF process is performed, the camera control circuit 40 adjusts a lens position of the focus lens 44 under instructions by the processor 24. As a result, a through image bringing the object into focus is displayed on the display 30.

Next, if and when an imaging operation of a still image is performed to the key input device 26, the processor 24 performs a main imaging process of a still image. More specifically, the processor 24 applies the signal processing to the raw image signal of SXGA output from the image sensor 42, and then, temporally saves the same in the RAM34, and performs the recording processing to the flash memory 32. If and when the recording processing is performed, the image data is read from the RAM 34 via the processor 24. The processor 24 associates meta-information with the image data that is read, and records in the flash memory 32 as one file. The processor 24 further causes a speaker not shown to output a sound notifying that the main imaging process is being performed.

In addition, the meta-information includes time information, an image size, a model name (type number) of the mobile phone 10, etc. Furthermore, in a case where a memory card can be connected to the mobile phone 10, the image data may be saved in the memory card. The meta-information related to the image data is saved in Exif format.

The wireless communication circuit 14 is a circuit for performing a wireless communication with a CDMA system. If and when the user designates a telephone call using the key input device 26, for example, the wireless communication circuit 14 performs the telephone call processing under instructions from the processor 24 and outputs a telephone call signal via the antenna 12. The telephone call signal is transmitted to a telephone at the other end of the line through a base station and a communication network (not shown). Then, the incoming processing is performed in the telephone at the other end of the line, a communication-capable state is established and the processor 24 starts the telephone communication processing.

Describing specifically the normal telephone communication processing, a modulated sound signal sent from a telephone at the other end of the line is received by the antenna 12. The modulated sound signal that is received is subjected to the demodulation processing and the decode processing by the wireless communication circuit 14. A received sound signal obtained through such processing is converted into an analog sound signal by the D/A converter 20 to be output from the speaker 22. On the other hand, a sending sound signal taken-in through the microphone 18 is converted into a digital sound signal by the A/D converter 18 to be applied to the processor 24. The sending sound signal which is converted into the digital sound signal is subjected to the encode processing and the modulation processing by the wireless communication circuit 14 under instructions by the processor 24 to be output via the antenna 12. Therefore, the sound signal that is modulated is transmitted to the telephone at the other end of the line via the base station and the communication network.

If and when the telephone call signal from a telephone at the other end of the line is received by the antenna 12, the wireless communication circuit 14 notifies the processor 24 of the incoming call. In response thereto, the processor 24 displays on the display 30 sender information (telephone number and so on) described in the incoming call notification by controlling the display driver 28. In addition, at the approximately same time, the processor 24 causes the speaker (not shown) to output a ringtone (may be also called as a ringtone melody, a ringtone voice).

Then, if and when the user performs a responding operation by using the call key, the wireless communication circuit 14 performs the incoming call processing under instructions by the processor 24, whereby the communication-capable state is established, and the processor 24 performs the above-described normal telephone communication processing.

If and when the telephone communication ending operation is performed by the end key after a state is changed to the communication-capable state, the processor 24 transmits the telephone communication ending signal to the telephone at the other end of the line by controlling the wireless communication circuit 14. Then, after the transmission of the telephone communication ending signal, the processor 24 terminates the telephone communication processing. Furthermore, in a case where the telephone ending signal from the telephone at the other end of the line is first received, the processor 24 also terminates the telephone communication processing. In addition, in a case where the telephone communication ending signal is received from the mobile communication network not from the telephone at the other end of the line, the processor 24 also terminates the telephone communication processing.

Figure 2:
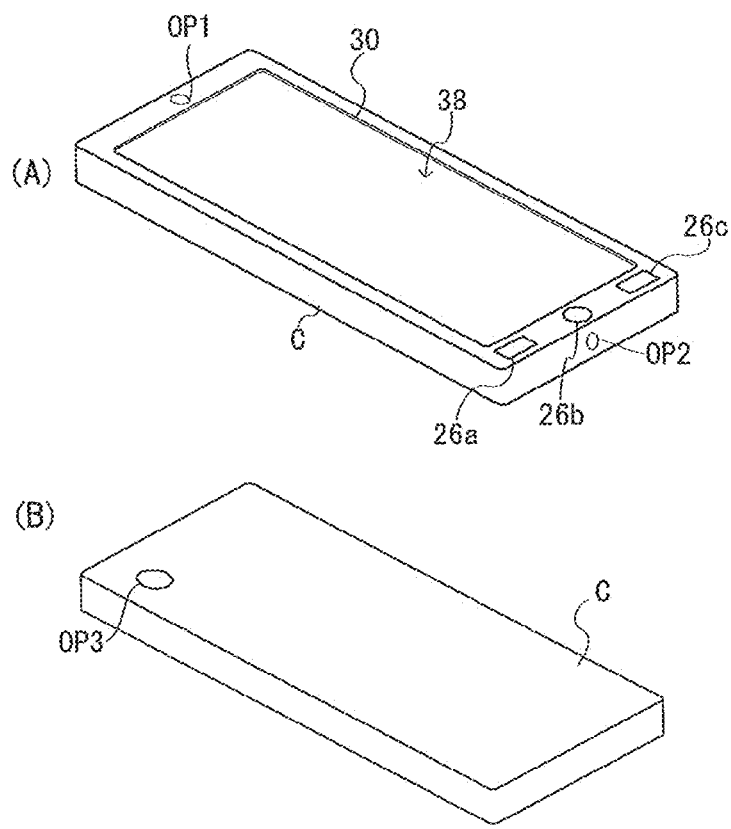
FIG. 2 is a view showing an appearance of the mobile phone shown in FIG. 1.

FIG. 2(A) is an appearance view showing an appearance of a top surface of the mobile phone 10, and FIG. 2(B) is an appearance view showing an appearance of a rear surface of the mobile phone 10. With referring to FIG. 2(A), the mobile phone 10 has a shape of straight-type and a housing C of a rectangular in plane. The microphone 18 (not shown) is housed within the housing C, and an opening OP2 that is communicated with the housed microphone 18 is provided on the side surface at one end in a longitudinal direction of the housing C. A speaker 22 (not shown) is also housed within the housing C, and an opening OP1 that is communicated with the housed speaker 22 is provided on the surface at the other end in the longitudinal direction of the housing C.

The display 30 is mounted in such a manner that a monitor screen can be seen from a top surface side. Then, a touch panel 38 is provided on the display 30. Furthermore, a camera module (not shown) is also housed in the housing C, and an opening OP3 that is communicated with the focus lens 44, etc. of the camera module is provided on the rear surface at the other end in the longitudinal direction of the housing C. Various kinds of keys included in the key input device 26 include the call key 26a, the menu key 26b and the end key 26c, and these keys are provided on the top surface of the housing C.

For example, the user inputs a telephone number by performing a touch operation onto the dial key that is displayed on the display 30, and by the call key 26a, performs a voice transmission operation. Then, if and when the telephone communication is ended, the user performs the ending operation by the end key 26c. Furthermore, the user operates the function key 26b to display a menu screen on the display 30. The user further performs a selection and decision of the menu by performing touch operations onto a soft key and a menu both being displayed on the display 30. The user can image an object by performing an imaging operation by turning the rear surface of the housing C toward an object.

In addition, the antenna 12, the wireless communication circuit 14, the A/D converter 16, the D/A converter 20, the processor 24, the display driver 28, the flash memory 32, the RAM 34, and the touch panel control circuit 36 are housed within the housing C, and therefore, not shown in FIG. 2(A) and FIG. 2(B).

Figure 3:
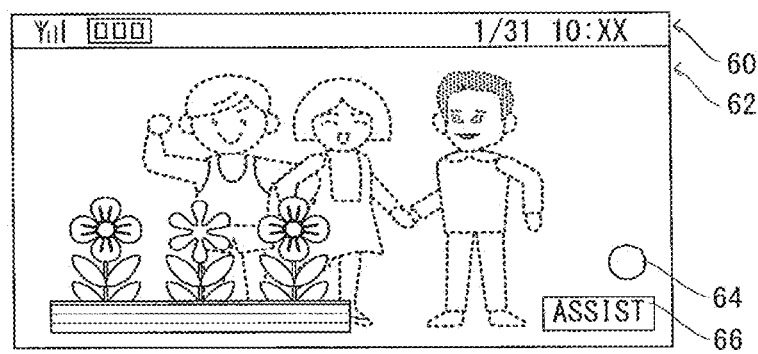
FIG. 3 is a view showing an example of a through image in a first embodiment displayed on a display shown in FIG. 1.

FIG. 3 is a view showing an example of the display 30 which displays a through image. A displaying area of the display 30 includes a status displaying area 60 including icons representing a time and date, a residual amount of the battery, a reception state, etc., and a function displaying area 62 in which a through image is displayed. In the function displaying area 62, as processing keys associated with the imaging, an imaging key 64 for performing an imaging process and an assist key 66 for performing an assisting function of the camera function are displayed.

With referring to FIG. 3, a flower bed and persons stand in this order from a side of the mobile phone 10 in an object scene, and the function displaying area 62 displays a through image that is focused to the flower bed existing in front of the persons. Here, the user can perform an AF process by touching an arbitrary position in the function displaying area 62. Furthermore, if and when the imaging key 64 is operated after the AF process is performed, image data corresponding to the through image shown in FIG. 3 is saved in the flash memory 32.

With referring to FIG. 4(A), for example, if and when a position of the persons included in the through image is touched, a lens position of the focus lens 44 is adjusted such that a focus evaluating value of a predetermined range with a touch point as a center becomes maximum. As a result, as shown in FIG. 4(B), a through image that is focused onto the persons existing in the rear of the flower bed becomes to be displayed. That is, it is possible for the user, only by touching an arbitrary position, to display a through image focused onto the touch position.

Furthermore, if and when the assist key 66 shown in FIG. 3 and so on is operated, as shown in FIG. 5(A), an assist key group including a grid key 68 and a setting key 70 is displayed in the function displaying area 62 instead of the assist key 66. The grid key 68 is a key for displaying a grid constituted by a plurality of vertical lines and a plurality of horizontal lines in the function displaying area 62. For example, the user can decide a composition of image to be imaged by utilizing the grid being displayed.

Furthermore, the setting key 70 is a key for setting an ineffective region for making a touch operation ineffective within a touch range of the touch panel 38. With referring to FIG. 5(B), for example, if and when the setting key 70 is operated, respective keys being displayed in the function displaying area 62 are non-displayed. In this state, if and when a position T1 and a position T2 are touched, an ineffective region is set within the touch range based on first coordinates and second coordinates respectively corresponding to these positions.

With referring to FIG. 5(C), for example, an ineffective region 74 is set such that two apexes of an effective region within the touch range become the first coordinates and the second coordinate. Furthermore, within the effective region, the imaging key 64 and a cancel key 72 are displayed. In addition, the cancel key 72 is also included in the above-described processing keys.

In addition, a position that is to be touched by the user is not limited to the position shown in FIG. 5(B). That is, the user can arbitrarily decide a range of an ineffective region 74.

Here, in the first embodiment, although the ineffective region 74 is illustrated with slant lines in order to make the understanding clear, in fact, the ineffective region 74 is never recognized by the user.

Thus, in this embodiment, since the key is displayed within the effective region, even if the ineffective region 74 is set, it is possible to keep an operability of the mobile phone 10.

Furthermore, in a case where the mobile phone 10 is held in a state that the ineffective region 74 is set, even if the user presses a side portion of the housing C by a hand, it is possible to reduce a possibility that the touch panel 38 is erroneously operated by the hand or finger.

Furthermore, since the through image can be displayed with no change in its size by not displaying the ineffective region 74, it is possible to prevent a visibility of the through image that is displayed on the display 30 from getting worse. Then, the user can grasp a rough position and range of the ineffective region 64 by seeing the imaging key 64 or the like that is displayed after the ineffective region 74 is set.

In addition, if and when the cancel key 72 is operated, the ineffective region 74 is canceled, and the displaying of the display 30 returns to a state shown in FIG. 5(A). That is, by utilizing the setting key 70 and the cancel key 72, the user can arbitrarily set or cancel an ineffective region.

Furthermore, in this embodiment, even in a state that the ineffective region is set, an image can be imaged by utilizing the touch panel 38.

Furthermore, in this embodiment, the imaging key 64 and the cancel key 72 are displayed at predetermined positions from the lower right of the effective region.

In addition, if and when a first predetermined time period (30 seconds, for example) elapses without a touch operation in a state shown in FIG. 5(B), the displaying returns to a state of FIG. 5(A) after an error message is displayed. More specifically, even if the state transits to a state that receives an operation for setting an ineffective region by operating the setting key 70, if and when the first predetermined time period elapses while no touch operation is performed, the displaying of the display 30 returns to its original state.

Figure 6:
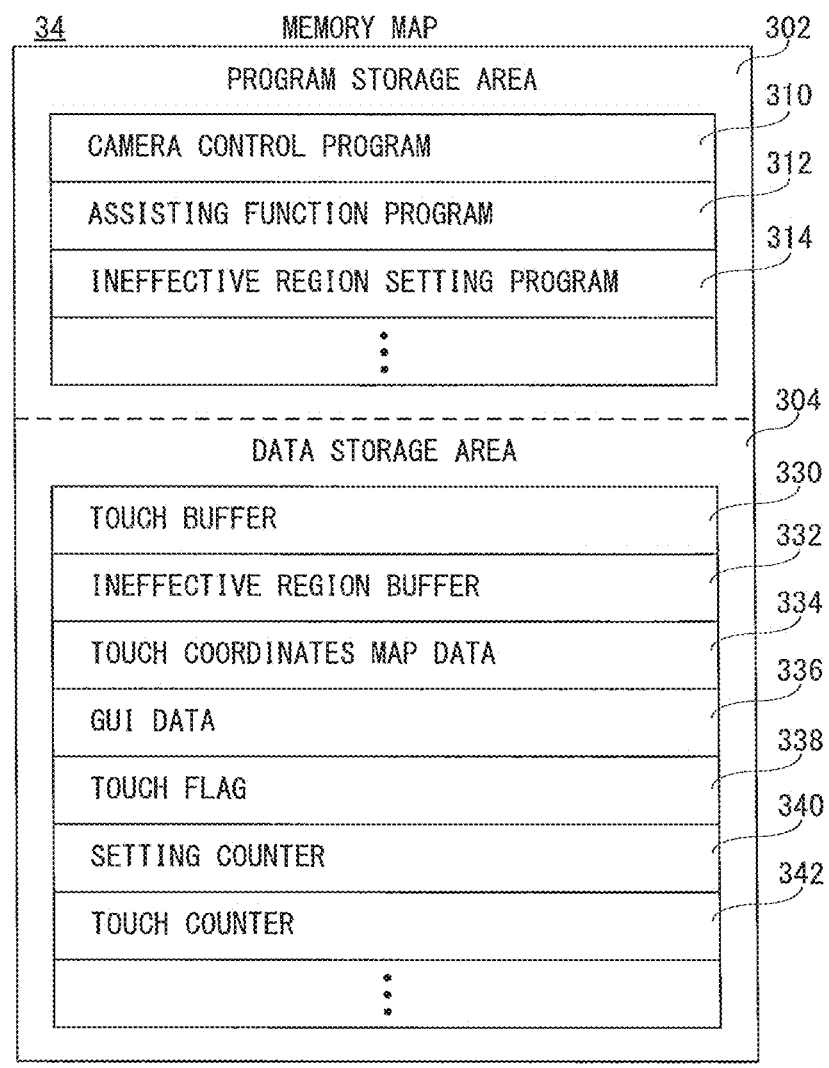
FIG. 6 is a view showing an example of a memory map of a RAM shown in FIG. 1.

FIG. 6 is a view showing a memory map of the RAM 34. In the memory map of the RAM 34, a program storage area 302 and a data storage area 304 are included. The program and data are read wholly once or partially and sequentially according to necessity from the flash memory 32 to be stored in the RAM 34, and then, processed by the processor 24.

The program storage area 302 is stored with programs for operating the mobile phone 10. The programs for operating the mobile phone 10 includes, a camera control program 310, an assisting function program 312, an ineffective region setting program 314, etc., for example.

The camera control program 310 is a program to be performed for implementing the camera function, and causes the AF process, the imaging process, etc. to be performed as subroutines. The assisting function program 312 is a program of a subroutine of the above-described camera control program 310, and a program for displaying a grid and for controlling the setting/cancel of the ineffective region. The ineffective region setting program 314 is a subroutine of the assisting function program 312, and a program for setting the ineffective region based on a touch operation for setting the ineffective region.

In addition, although not shown, the programs for operating the mobile phone 10 include a program for notifying a user of an incoming call state, a program for performing the AF control and the imaging control.

The data storage area 304 is provided with a touch buffer 330 and an ineffective region buffer 332, and stored with touch coordinates map data 334 and GUI data 336. The data storage area 304 is further provided with a touch flag 338, a setting counter 340 and a touch counter 342.

The touch buffer 330 is temporarily stored with data of touch coordinates such as a touch point, a release point, a current touch position, etc. that are obtained by the touch operation. The ineffective region buffer 332 is temporarily stored with data of a coordinates range of the ineffective region that is set, and the first coordinates and the second coordinates.

The touch coordinates map data 334 is data for converting the touch coordinates saved in the touch buffer 330 into the displaying coordinates of the display 30. The GUI data 336 includes image dada for a GUI to be displayed on the display 30, and accordingly, the processor 24 displays the imaging key 64 and the assist key 66 based on the GUI data 336.

The touch flag 338 is a flag for determining whether the touch operation is performed. The touch flag 338 is constituted by a 1-bit register, for example. If and when the touch flag 338 is turned-on (true), a data value "1" is set in the register. If and when the touch flag 338 is turned-off (false), a data value "0" is set in the register. In addition, in this embodiment, the touch operation is made ineffective even if the touch panel control circuit 36 detects the touch operation by making on/off of the touch flag 338 not be switched if and when the touch position by the touch operation is included within the ineffective region 74.

The setting counter 340 is a counter for counting a time period after the setting key 70 is operated. More specifically, the processor 24 performs determination on whether the displaying of the display 30 is to be returned from the state in FIG. 5(B) to the state of FIG. 5(A) based on a value of the setting counter 340.

The touch counter 342 is a counter for counting a time period during which the touch operation is being performed. Since the touch counter 342 will be described in detail in a third embodiment described later, a detailed description thereof is omitted here.

Although not shown, the data storage area 304 is stored with image data displayed in a standby state, data of a character string, etc., and further provided with counters and flags necessary for operation of the mobile phone 10.

Figure 7:
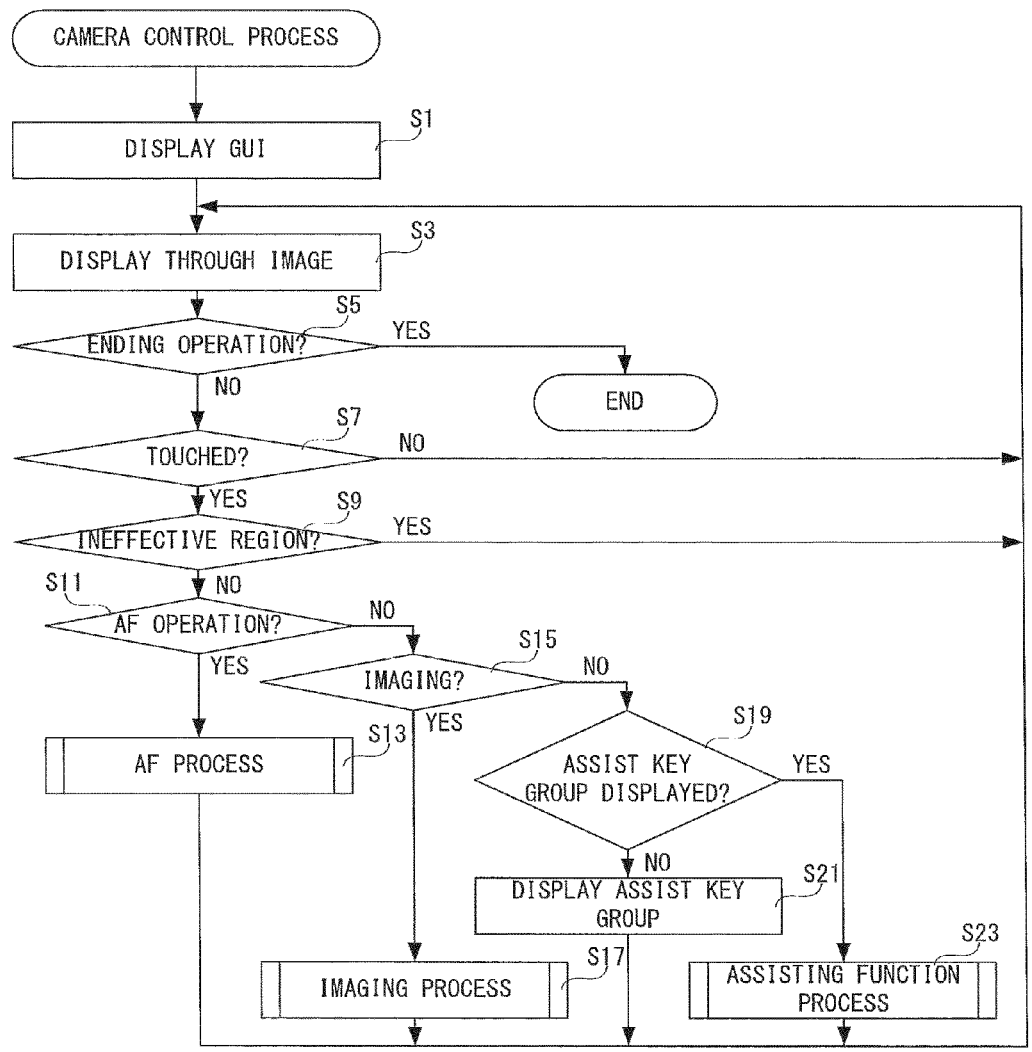
FIG. 7 is a flowchart showing an example of a camera control process for a processor shown in FIG. 1.
Figure 8:
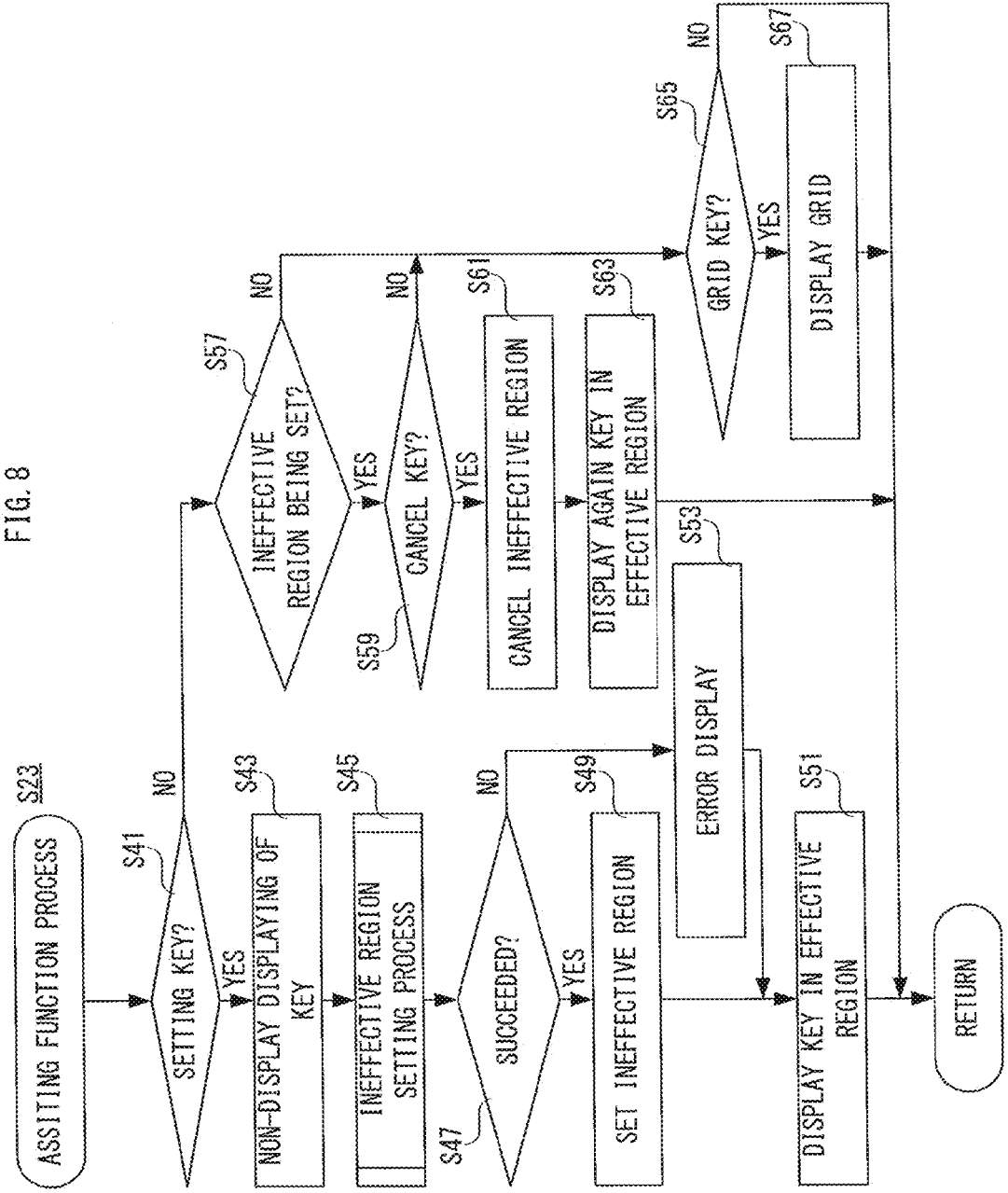
FIG. 8 is a flowchart showing an example of an assisting function process in the first embodiment for the processor shown in FIG. 1.
Figure 9:
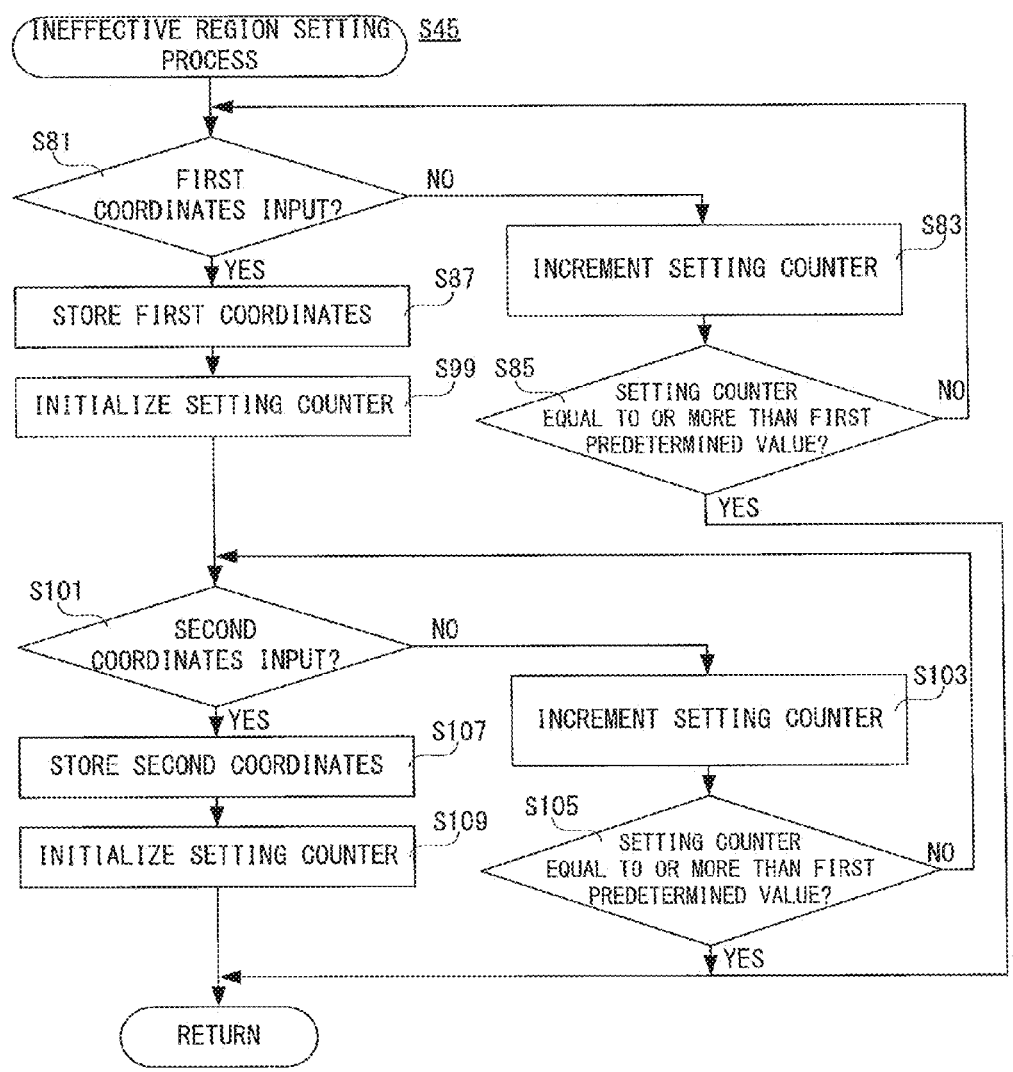
FIG. 9 is a flowchart showing an example of an ineffective region setting process in the first embodiment for the processor shown in FIG. 1.

The processor 24 processes a plurality of tasks including a camera control process shown in FIG. 7, an assisting function process shown in FIG. 8, an ineffective region setting process shown in FIG. 9, etc., in parallel with each other under controls of Linux®-base OS such as Android® and REX, or other OSs.

FIG. 7 is a flowchart of a camera control process. If and when an operation for performing the camera function is made, the processor 24 displays the GUI on the display 30. That is, the processor 24 displays the imaging key 64, the assist key 66, etc. based on the GUI data 336 as shown in FIG. 3. Subsequently, in a step S3, a through image is displayed. That is, based on the image data output from the camera control circuit 40, a through image is displayed on the display 30. Next, in a step S5, it is determined whether an ending operation for the camera function is made. It is determined whether the end key 26c is operated, for example. If and when "YES" is determined in the step S5, that is, if and when the end key 26c, for example, is operated, the camera control process is terminated.

In addition, if and when "NO" is determined in the step S5, that is, if no operation for ending the camera function is performed, it is determined whether a touch is performed in a step S7. That is, it is determined whether the touch operation is detected by the touch panel control circuit 36 and thus the touch flag 338 is turned-on. If and when "NO" is determined in the step S7, that is, if the touch panel 38 is not touched, the process returns to the step S3. If and when "YES" is determined in the step S7, that is, if and when the touch panel 38 is touched, in a step S9, it is determined whether a position being touched is in the ineffective region. That is, it is determined whether the coordinates indicating the touch point recorded in the touch buffer 330 and the coordinates indicating a current touch point are included within the coordinates range stored in the ineffective region buffer 332. If and when "YES" is determined in the step S9, that is, if and when the touch point, for example, is included in the coordinates range of the ineffective region, the process returns to the step S3.

Furthermore, if and when "NO" is determined in the step S9, that is, if the touch point is not included in the coordinates range in the ineffective region, for example, it is determined whether the operation is for the AF operation in a step S11. It is determined whether the position being touched is within the effective region that no key is being displayed, for example. If and when "YES" is determined in the step S11, that is, if and when the user touches an arbitrary position as shown in FIG. 4(A), for example, the AF process is performed in a step S13. If and when the AF process is performed, a lens position of the focus lens 44 is adjusted such that the focus evaluating value is made maximum in a predetermined range with the touch point as a center. Then, if and when the processing of the step S13 is ended, the process returns to the step S3.

Furthermore, if and when "NO" is determined in the step S11, that is, if and when a displaying range of a key such as the imaging key 64 or the assist key 66, for example, is touched in a step S15, it is determined whether the operation is for the imaging operation. That is, it is determined whether the touch point is included in the displaying range of the imaging key 64. If and when "YES" is determined in the step S15, that is, if and when the touch operation is made to the imaging key 64, the imaging process is performed in a step S17. That is, as described above, the image data output from the camera control circuit 40 is saved in the flash memory 32. Then, if and when the processing of the step S17 is ended, the process returns to the step S3. In addition, the processor 24 performing the processing in the step S17 functions as a performing portion or module.

If and when "NO" is determined in the step S15, that is, if no touch operation is made to the imaging key 64, it is determined whether the assist key group is being displayed in a step S19. That is, it is determined whether the grid key 68 and the setting key 70 are displayed as shown in FIG. 5(A) instead of the assist key 66. If and when "NO" is determined in the step S19, that is, if and when the assist key 66 is being displayed, it is determined that the key is operated, and the assist key group is displayed in a step S21, and then, the process returns to the step S3. That is, instead of the assist key 66, the grid key 68 and the setting key 70 are displayed in the function displaying area 62.

If and when "YES" is determined in the step S19, that is, if and when the grid key 68 and the setting key 70, for example, are being displayed in the function displaying area 62, it is determined that the keys are operated, and the assisting function process is performed in the step S23, and then, the process returns to the step S3.

FIG. 8 is a flowchart of the assisting function process. As described above, if and when the processing in the step S23 is performed, in a step S41, the processor 24 determines whether the operated is the setting key 70. That is, it is determined whether a touch point is included within the displaying range of the setting key 70. If and when "YES" is determined in the step S41, that is, if and when the touch operation is made to the setting key 70, the displaying of the key is non-displayed in a step S43. That is, as shown in FIG. 5(B), the displaying of the imaging key 64, the grid key 68 and the setting key 70 is non-displayed. Subsequently, in a step S45, the ineffective region setting process is performed. In addition, the ineffective region setting process will be described in detail by using a flowchart shown in FIG. 9, and therefore, a description thereof is omitted here.

Next, in a step S47, it is determined whether a setting operation is succeeded. That is, it is determined whether the first coordinates and the second coordinates are saved in the ineffective region buffer 332. If and when "YES" is determined in the step S47, that is, if and when the first coordinates and the second coordinates are saved in the ineffective region buffer 332, in a step S49, an ineffective region is set. If and when the first coordinates and the second coordinates corresponding to the positions T1 and T2 shown in FIG. 5(B), for example, are stored in the ineffective region buffer 332, an ineffective region 74 shown in FIG. 5(C) is set. Next, in a step S51, the key is displayed in the effective region. That is, as shown in FIG. 5(C), the imaging key 64 and the cancel key 72 are displayed at predetermined positions from the lower right of the effective region. Then, if and when the processing in the step S51 is ended, the processor 24 terminates the assisting function process, and the process returns to the camera control process. In addition, the processor 24 performing the processing in the step S49 functions as a setting portion or module, and the processor 24 performing the processing in the step S51 functions as a key displaying portion or module.

On the other hand, if and when "NO" is determined in the step S47, that is, in a case where the setting operation fails, the process proceeds to a step S51 after the error displaying is performed in a step S53. If and when a first predetermined time period elapses while no touch operation is performed after the setting key 64 is operated, it is determined that the setting operation fails in the step S47, a character string of "failure in setting of ineffective region" is displayed on the display 30 in a step S53. Then, in the step S51, the imaging key 64, the grid key 68 and the setting key 70 are displayed to be rendered as the state of FIG. 5(A).

Furthermore, if and when "NO" is determined in the step S41, that is, if no touch operation is made to the setting key 70, it is determined whether the ineffective region is being set in a step S57. That is, it is determined whether data showing the coordinates range of the ineffective region is recorded in the ineffective region buffer 332. If and when "NO" is determined in the step S57, that is, if the ineffective region is not being set, the process proceeds to a step S65. On the other hand, if and when "YES" is determined in the step S57, that is, if and when the ineffective region 74 is being set within the touch range as shown in FIG. 5(C), for example, in a step S59, it is determined that the operated is the cancel key 72. That is, it is determined that a touch point is included in the displaying range of the cancel key 72. If and when "NO" is determined in the step S59, that is, if the touch operation is not performed to the cancel key 72, the process proceeds to the step S65.

Furthermore, if and when "YES" is determined in the step S59, that is, if and when the touch operation is made onto the cancel key 72 shown in FIG. 5(C), for example, in a step S61, the ineffective region 74 is canceled and the key is displayed again in the effective region in a step S63. That is, the ineffective region buffer 332 is initialized. Furthermore, after the displaying of the imaging key 64 and the cancel key 72 is non-displayed, the imaging key 64, the grid key 68 and the setting key 70 are displayed as shown in FIG. 5(A). Then, if and when the processing of the step S63 is ended, the processor 24 terminates the assisting function process, and thereafter the process returns to the camera control process. In addition, the processor performing the processing of the step S61 functions as a canceling portion or module.

In addition, if an ineffective region is not being set, or if the touch operation to the cancel key 72 is not performed even if and when the ineffective region is set, in a step S65, it is determined whether the operated is the grid key 68. That is, it is determined whether a touch point is included in the displaying range of the grid key 68. If and when "YES" is determined in the step S65, that is, if and when the grid key 68 is touch-operated, the grid is displayed in a step S67, and then, the assisting function process is ended. If and when "NO" is determined in the step S65, that is, if the grid key 68 is not touch-operated, the processor 24 terminates the assisting function process.

FIG. 9 is a flowchart of the ineffective region setting process. If and when the step S45 is performed in the assisting function process, for example, in a step S 81, the processor 24 determines whether the first coordinates are designated. For example, it is determined whether the touch panel 38 is touched and a touch point is stored in the touch buffer 330. If and when "NO" is determined in the step S81, that is, if not touched, the setting counter 340 is incremented in a step S83. That is, a time period after the touch operation is made to the setting key until the touch panel 38 is touched is counted. Subsequently, in a step S85, it is determined whether a value of the setting counter is equal to or more than a first predetermined value. That is, it is determined whether the first predetermined time period (30 seconds, for example) elapses after the touch operation is made to the setting key 70 shown in FIG. 5(A). In a case where the setting counter 340 is incremented every approximately 100 milliseconds, for example, the value of the first predetermined value becomes "300". Then, in the step S85, it is determined whether the value of the setting counter 340 is equal to or more than the first predetermined value that is described above. If and when "YES" is determined in the step S85, that is, if and when the first predetermined time period elapses while no touch operation is made, the ineffective region setting process is ended, and the process returns to the assisting function process. On the other hand, if and when "NO" is determined in the step S85, that is, if and when the first predetermined time period does not elapse while no touch operation is made, the process returns to the step S81.

In addition, if and when "YES" is determined in the step S81, that is, if and when the position T1 shown in FIG. 5(B), for example, is touched, the first coordinates are stored in a step S87. The coordinates of the position T1 shown in FIG. 5(B), for example, are stored in the ineffective region buffer 332 as the first coordinates. Then, in a step S99, the setting counter 340 is initialized. That is, since the first coordinates are stored, the value of the setting counter 340 is initialized. In addition, the processor 24 performing the processing of the step S87 functions as a first storing portion or module.

Subsequently, in a step S101, it is determined whether the second coordinates are input. That is, it is determined whether the touch operation for inputting coordinates of a second place is performed. If and when "NO" is determined in the step S101, that is, if no touch operation for inputting the coordinates for a second place is performed, in a step S103, the setting counter 340 is incremented. Furthermore, in a step S105, it is determined whether a value of the setting counter 340 is equal to or more than the first predetermined value. Since the processing in the step S103 and the processing in the step S105 are the same as those in the steps S83 and S85, a detailed description thereof is omitted here.

If and when "YES" is determined in the step S105, that is, if and when the first predetermined time period elapses while no touch operation for inputting the second place is being performed after the first coordinates are stored, the ineffective region setting process is ended, and the process returns to the assisting function process. On the other hand, if and when "NO" is determined in the step S105, that is, if and when the first predetermined time period does not elapse, the process returns to the step S101.

If and when "YES" is determined in the step S101, that is, if and when a position T2, for example, is touched, the second coordinates are stored in a step S107, and the setting counter 340 is initialized in a step S109. In the step S107, the coordinates of the position T2, for example, are stored in the ineffective region buffer 332 as the second coordinates. In addition, the processor 24 performing the processing of the step S107 functions as a second storing portion or module.

Second Embodiment

In the second embodiment, an ineffective region is set based on a time that a touch operation is being performed, and a size of the ineffective region is also decided based on the time. In addition, since a mobile phone 10 for the second embodiment is the same or similar to that of the first embodiment, a description of the electrical structure of the mobile phone 10, the memory map of the RAM 34 and duplicate flowcharts and so on is omitted.

If and when an operating time period until the touch operation is released after the touch operation is performed onto the setting key 70 shown in FIG. 5, for example, is shorter, as shown in FIG. 10(A), an ineffective region 74 is set narrower. On the other hand, if and when the time until the touch operation is released after the touch is performed is longer, as shown in FIG. 10(B), an ineffective region is set wider. That is, the user can set an ineffective region only by touching and arbitrarily decide a size thereof.

In addition, in the second embodiment, an ineffective region is not set if and when the operating time period is shorter than a second predetermined time period (1 second, for example). This is for preventing an ineffective region to be set from being rendered too narrow.

Figure 11:
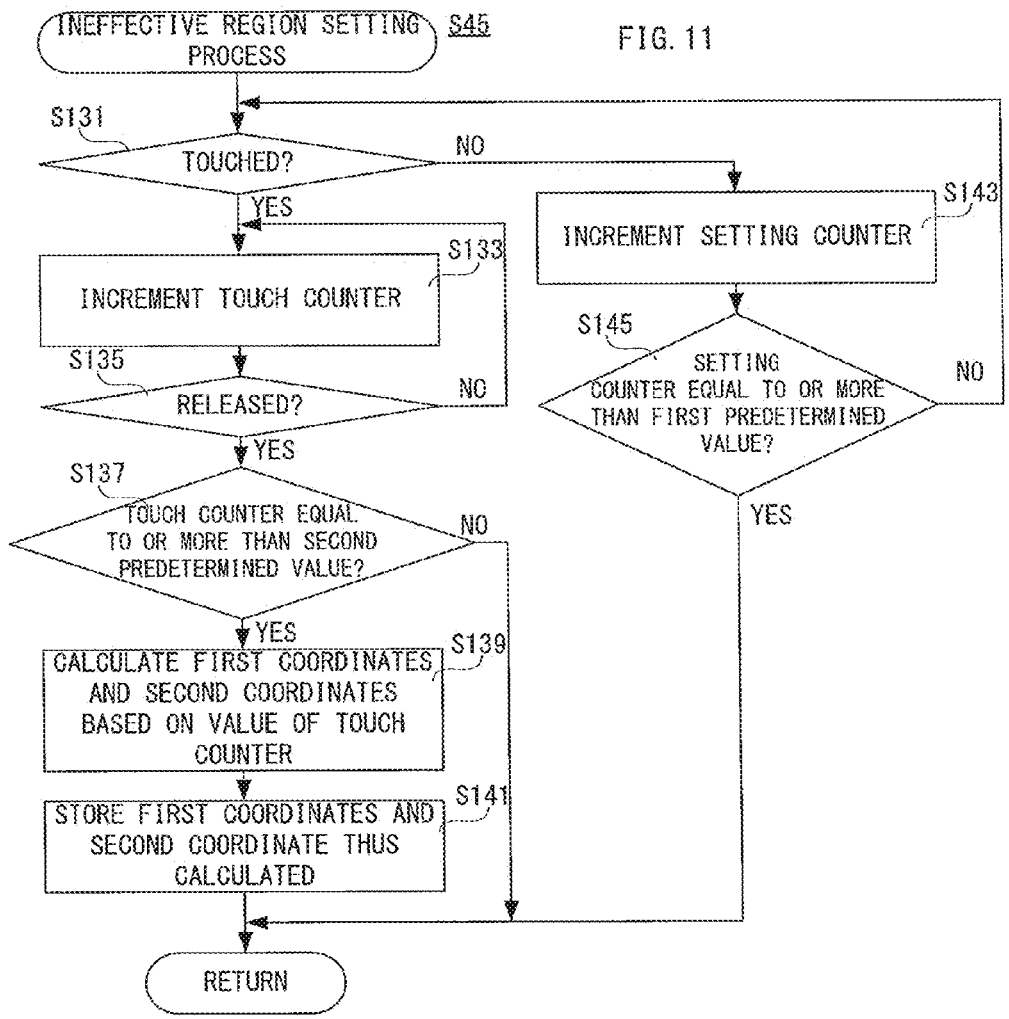
FIG. 11 is a flowchart showing an example of an ineffective region setting process in the second embodiment for the processor shown in FIG. 1.

The processor 24 of the second embodiment processes a plurality of tasks including an ineffective region setting process shown in FIG. 11 in addition to a plurality of processes shown in FIG. 7 and FIG. 8 in parallel with each other under controls of Linux-base OS such as Android and REX, or other OSs.

FIG. 11 is a flowchart of an ineffective region setting process in the second embodiment. If and when the step S45 is performed in the assisting function process, in a step S131, the processor 24 determines whether a touch operation is made. That is, it is determined whether the touch flag 338 is turned-on. Next, in a step S133, the touch counter 342 is incremented. That is, in order to count the above-described operating time period, the touch counter 342 is incremented. In addition, touch counter 342 is incremented for every approximately 50 milliseconds.

Subsequently, in a step S135, it is determined whether the release is performed. For example, it is determined whether the touch flag 338 is changed to an off by releasing the finger from the touch panel 38 by the user. In addition, the processor 24 performing the processing in the steps S133 and S135 functions as a counting portion or module.

If and when "NO" is determined in the step S135, that is, if and when the touch flag 338 is still turned-on, the process returns to the step S133. If and when "YES" is determined in the step S135, that is, if and when the touch flag 338 is changed to the off by releasing the finger of the user is released from the touch panel 38, for example, it is determined, in a step S137, whether a value of the touch counter is equal to or more than a second predetermined value. That is, it is determined whether the operating time period is equal to or more than a second predetermined time period. In a case where the touch counter 338 is incremented on a cycle of the above-described period (50 milliseconds, for example), the second predetermined value becomes "20". Then, in the step S137, it is determined whether a value of the touch counter 338 is equal to or more than the above-described second predetermined value.

If and when "NO" is determined in the step S137, that is, if and when the operating time period is shorter than the second predetermined time period, the ineffective region setting process is ended while the first coordinates and the second coordinates are not calculated, and the process by the processor 24 returns to the assisting function process that is a higher rank routine.

If and when "YES" is determined in the step S137, that is, if and when the operating time period is equal to or more than the second predetermined time period, in a step S139, the first coordinates and the second coordinates are calculated based on the value of the touch counter 338.

Describing specifically, in the second embodiment, a linear function that has the origin at the lower left of the function displaying area 62 and passes the origin and the upper right of the function displaying area 62 is defined in advance. Therefore, in the step S139, the value of the touch counter 338 is firstly converted into the coordinates in the horizontal axis (X axis) of the function displaying area, and by substituting the coordinates converted for a variable of the horizontal axis (X axis) of the above-described linear function, a position of the vertical axis (Y axis) is calculated. Then, the positions (coordinates) of the horizontal axis and the vertical axis thus calculated are rendered as the first coordinates. Furthermore, in the step S139, the coordinates that the first coordinates is rotated by 180 degrees with respect to the center point of the function displaying area 62 is calculated as the second coordinates. Therefore, the processor 24 performing the processing of the step S139 functions as a calculating portion or module. In addition, in another embodiment, the first coordinates and the second coordinates may be calculated by utilizing another method.

Subsequently, in a step S141, the first coordinates and the second coordinates thus calculated are stored. That is, the above-described two coordinates are stored in the ineffective region buffer 332. Then, if and when the processing in the step S141 is ended, the processor 24 terminates the ineffective region setting process.

In addition, if and when "NO" is determined in the step S131, that is, if no touch operation is performed after the touch operation is made to the setting key 70, the setting counter 340 is incremented in a step S143, and in a step S145, it is determined whether the value of the setting counter 340 is equal to or more than the first predetermined value. That is, in the second embodiment as well, if and when the first predetermined time period elapses while no touch operation is performed after the touch operation to the setting key 70 is made, the ineffective region setting process is terminated.

Third Embodiment

In the third embodiment, an ineffective region is displayed so as to be visible by the user, and a size and a displaying range of the ineffective region can be arbitrarily changed. In addition, a mobile phone 10 for the third embodiment is the same or similar to that of the first embodiment, and accordingly, a description of the electrical structure of the mobile phone 10, the memory map of the RAM 34, a duplicate flowchart and so on is omitted.

Figure 12:
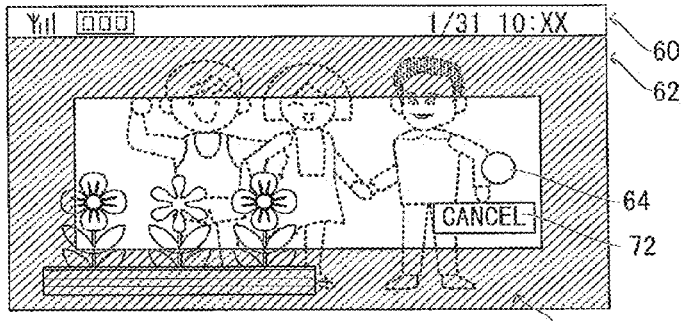
FIG. 12 is a view showing an example of a through image in a third embodiment displayed on the display shown in FIG. 1.

With referring to FIG. 12, in the third embodiment, an ineffective region 76 that is visible by the user is set. Accordingly, since it becomes possible for the user to clearly recognize a position of the ineffective region, an erroneous operation with respect to the touch panel 38 can be further reduced. Furthermore, it becomes possible for the user to arbitrarily change a position and a size of the ineffective region by an operation described below.

By sliding toward an outside after two points within the effective region are simultaneously touched as shown in FIG. 13(A), it is possible to make the ineffective region 76 narrower as shown in FIG. 13(B). In addition, although not shown, in a case where the slide is performed toward an inside, it is possible to make the ineffective region 76 wider.

Figure 14:
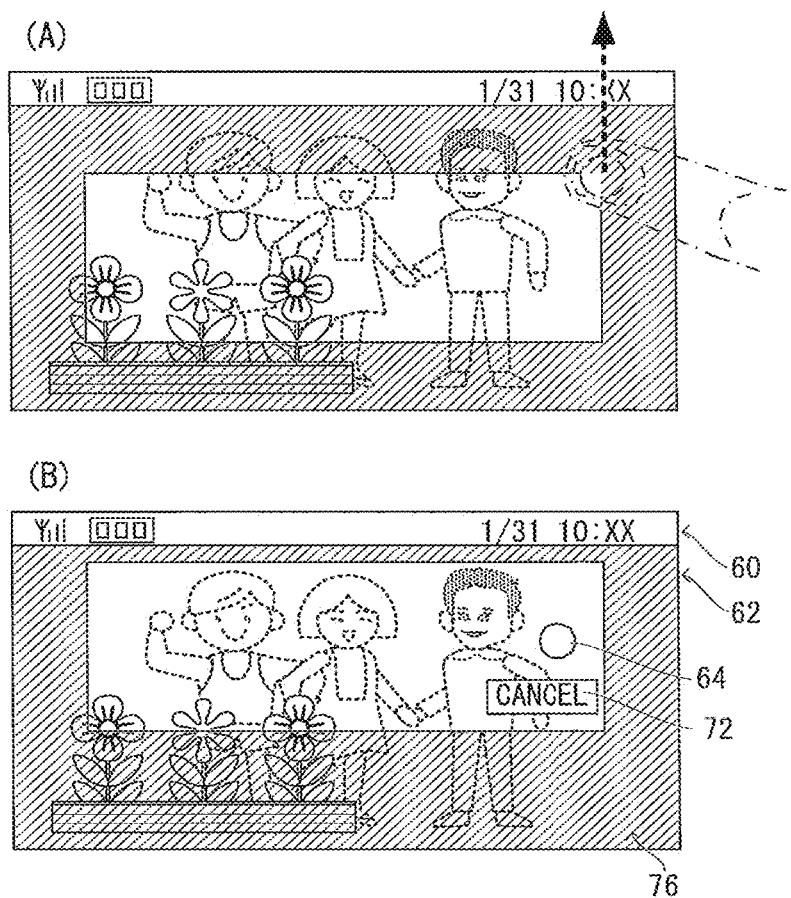
FIG. 14 is a view showing the other example of a through image in the third embodiment displayed on the display shown in FIG. 1.

Furthermore, if and when the slide is performed toward an upper direction while the upper right of the effective region is being touched as shown in FIG. 14(A), the displaying range of the ineffective region 74 is changed such that the effective region moves toward an upper side. That is, the position of the effective region is moved in accordance with a direction of the slide. Furthermore, although not shown, by performing the slide in an arbitrary direction not limited to the upper direction, the user can arbitrarily change the position of the effective region.

By performing the touch operation for changing the ineffective region 76 after the ineffective region is set, the size and the displaying range of the ineffective region can be arbitrarily changed.

In addition, in the ineffective region 76 of the third embodiment, slant lines are illustrated such that a through image is permeated; however, in another embodiment, a color that a permeability is set higher or a color having a permeability may be painted in the ineffective region 76.

Furthermore, in other embodiments, a boundary line may be displayed at a boundary portion between the ineffective region and the effective region, or a boundary indicator that is formed in a shape of Japanese quotes (brackets-like marks) at a boundary corner portions between the ineffective region and the effective region may be displayed. The boundary line or the boundary indicator may be a solid line, a dotted line or the like, or a line with a color having a permeability.

Figure 15:
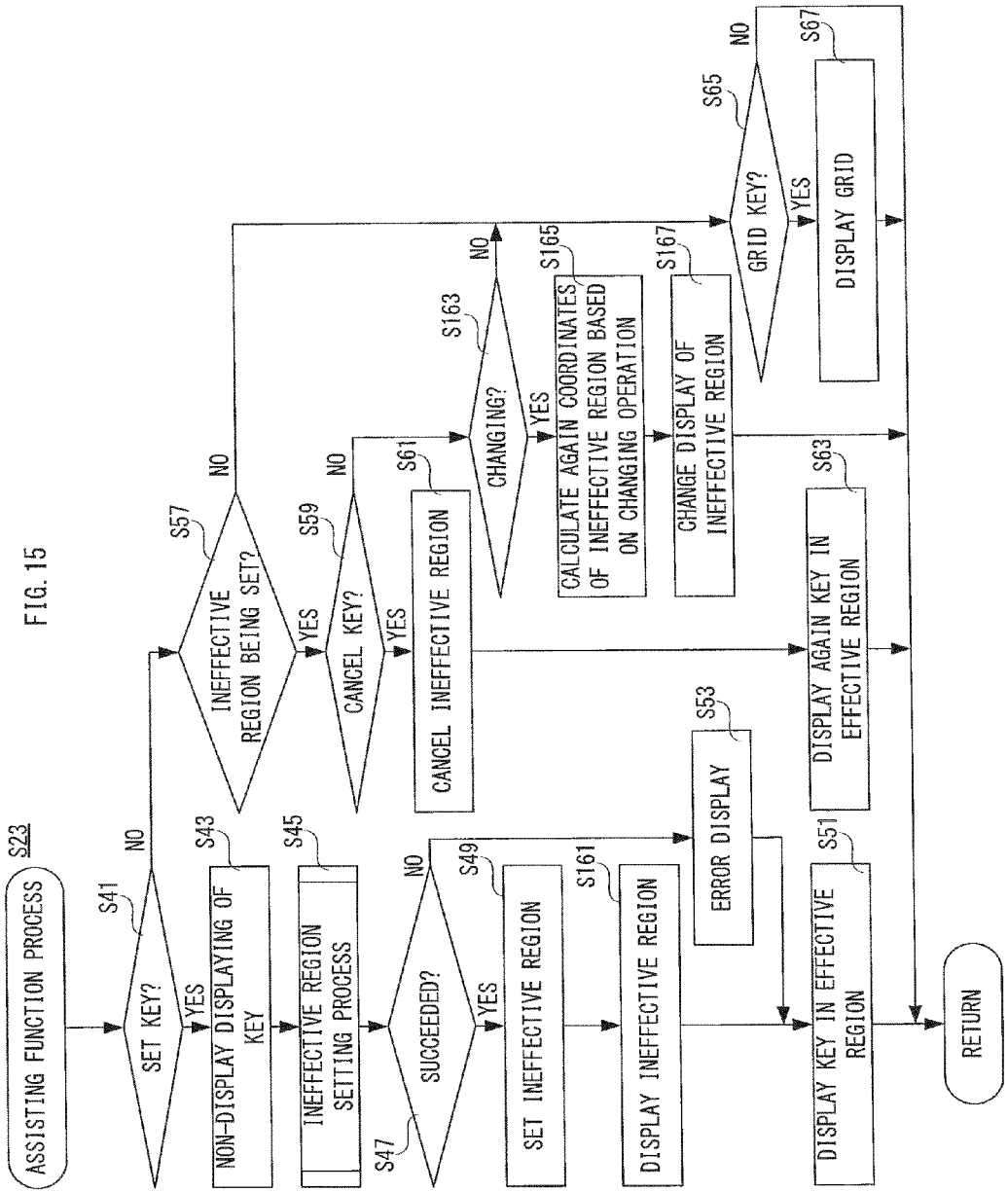
FIG. 15 is a flowchart showing an example of an assisting function process of the third embodiment by the processor shown in FIG. 1.

The processor 24 of the third embodiment processes a plurality of tasks including an assisting function process shown in FIG. 15 in addition to a plurality of processes shown in FIG. 7 and FIG. 9 (FIG. 11) in parallel with each other under controls of Linux-base OS such as Android and REX, or other OSs.

FIG. 15 is a flowchart of the assisting function process according to the third embodiment. In addition, by applying, in this flowchart, the same step numbers to steps the same as those of the assisting function process shown in FIG. 8, a detailed description thereof will be omitted.

The processor 24 determines whether the touch operation is performed to the setting key 70 in a step S41, and if and if and when "YES" is determined, the displaying of the key is non-displayed in a step S43. Subsequently, in a step S45, the ineffective region setting process is performed, and it is determined whether the setting operation is succeeded in a step S47. If and when "YES" is determined in the step S47, in a step S49, the ineffective region is set.

Subsequently, in a step S161, the ineffective region that is being set is displayed. That is, as shown in FIG. 12, the ineffective region 76 is displayed in the function displaying area 62. Then, in a step S51, the key is displayed in the effective region, and the assisting function process is ended, and the process returns to the camera function process. In addition, the processor 24 performing the processing of the step S161 functions as an ineffective region displaying portion or module.

In addition, if and when "NO" is determined in the step S47, that is, if and when the setting operation is not succeeded, the error displaying is performed in a step S53, and the process proceeds to the step S51.

If and when "NO" is determined in the step S41, that is, if no touch operation is performed to the setting key 70, in a step S57, it is determined whether the ineffective region is set. If and when "NO" is determined in the step S57, the process proceeds to a step S65, and if and when "YES" is determined, it is further determined whether the cancel key is operated in a step S59. If and when "YES" is determined in the step S59, the ineffective region is canceled in a step S61, and the key is displayed again in the effective region in a step S63. Then, if and when the processing of the step S63 is ended, the assisting function process is terminated.

If and when "NO" is determined in the step S59, that is, if no touch operation is performed to the cancel key, in a step S163, it is determined whether a changing operation is performed. For example, it is determined whether a changing operation that the slide is performed after two points are simultaneously touched or a changing operation that the slide is performed after the upper right of the effective region is touched is determined. If and when "NO" is determined in the step S163, the process proceeds to the step S65.

If and when "YES" is determined in the step S163, that is, if and when the changing operation that the slide is performed after the two points are touched as shown in FIG. 13(A) is performed, in a step S165, the coordinates of the ineffective region 74 are recalculated based on the changing operation. That is, the coordinates range of the ineffective region 76 is recalculated while the release points are rendered as the first coordinates and the second coordinates, respectively. In addition, if and when the changing operation that the slide is performed after the upper right of the effective region is touched is performed as shown in FIG. 14(A), by rendering the coordinates of the release point as the first coordinates, the second coordinates being situated at the opposite angle of the effective region is calculated. In addition, in another embodiment, the second coordinates may be calculated with another method.

Subsequently, in a step S167, the displaying of the ineffective region 76 is changed. That is, based on the first coordinates and the second coordinates that are recalculated in the above-described manner, the position that the ineffective region 76 is to be displayed is changed. Then, if and when the processing of the step S167 is ended, the assisting function process is also terminated. The processor 24 performing the processing in the step S167 functions as a changing portion or module.

In addition, if and when "NO" is determined in the step S57 or the step S163, in a step S65, it is determined whether the grid key 68 is operated, and if and when "YES" is determined, the grid is displayed.

Fourth Embodiment

In the fourth embodiment, an ineffective region can be set while the assist key 66 and the setting key 70 are not displayed in the effective region. In addition, a mobile phone 10 for the fourth embodiment is the same or similar to that of the first embodiment, and accordingly, a description of the electrical structure of the mobile phone 10, the memory map of the RAM 34, a duplicate flowchart and so on is omitted.

With referring to FIG. 16(A), for example, the assist key 66 and the setting key 70 are not displayed in the function displaying area 62. Then, if and when the touch and release against the touch panel 38 is performed continuously twice, as shown in FIG. 16(B), the ineffective region 76 is set. In addition, an operation including the continuous twice touch and release is called as "double touch" here.

Next, with referring to FIG. 16(B), in a case where the ineffective region 76 is set by the double touch, the imaging key 64 is displayed in the effective region, but the cancel key 72 is not displayed. In such a case, the user can cancel the ineffective region 76 by performing the double touch again within the effective region.

In addition, in the fourth embodiment, a size of the ineffective region 76 that is first set is decided in advance, and in a case where the size and a displaying position thereof is to be changed, the user may perform a changing operation described in the third embodiment. Furthermore, in another embodiment, the cancel key 72 that an X mark is illustrated may be displayed within the effective region. In addition, in the fourth embodiment, the grid can be displayed by long-depressing the menu key 26b.

Fifth Embodiment

In the fifth embodiment, as shown in FIG. 17, ineffective regions 76a and 76b are set in the function displaying area 62 in a manner that the ineffective region is divided into left and right portions. Although not shown, the ineffective region may be set in a manner that the same is divided into upper and lower portions, and the ineffective region may be set on any one of respective sides. In addition, a mobile phone 10 for the fifth embodiment is the same or similar to that of the first embodiment, and accordingly, a description of the electrical structure of the mobile phone 10, the memory map of the RAM 34, a duplicate flowchart and so on is omitted.

In addition, the first embodiment to the fifth embodiment can be arbitrarily combined with each other, and since a specific combination can be easily imagined, a detailed description thereof is omitted.

An ineffective region may be set based on a figure that the user depicts through the touch operation. In such a case, an ineffective region is set based on a rectangular shape that is formed by surrounding the depicted figure with a minimum size. Furthermore, the effective region in the above-described embodiments is shown in a quadrilateral shape, but it may be an ellipse shape or other polygons.

Furthermore, a communication system of the mobile phone 10 is a CDMA system, but an LTE (Long Term Evolution) system, a W-CDMA system, a GSM (Registered Trademark) system, a TDMA system, a FDMA system, a PHS system or the like may be adopted.

The plurality of programs used in the embodiments may be stored in a HDD of the server for data distribution, and distributed to the mobile phone 10 via the network. The plurality of programs may be stored in a storage medium such as an optical disk of CD, DVD, BD (Blu-ray Disc) or the like, a USB memory, a memory card, etc. and then, such the storage medium may be sold or distributed. In a case where the plurality of programs downloaded via the above-described server or storage medium are installed to a mobile phone having the structure equal to the structure of the embodiments, it is possible to obtain advantages equal to the advantages according to the embodiments.

Furthermore, the above-described embodiments may be adapted not only to the mobile phone 10 but also a so-called smartphone and a PDA (Personal Digital Assistant).

The specific numerical values mentioned in this specification such as the first predetermined time period, the second predetermined time period, the first predetermined value, the second predetermined value, a time period that the process is repeated, etc. are only examples, and changeable properly in accordance with the change of product specifications.

An embodiment is a mobile terminal which comprises a camera module operable to output an image of an object; a display that displays an image that is output by the camera module; a touch panel provided on the display; a detecting module operable to detect a touch operation on the touch panel within a touch range; and a performing module operable to perform a predetermined process associated with an imaging if and when the touch operation is detected by the detecting module, comprising: a setting module operable to set, inside the touch range, an ineffective region that makes the touch operation ineffective.

In the embodiment, the mobile terminal (10: a reference numeral exemplifying a corresponding portion in the embodiment, and so forth) comprises the camera module (40-44) which includes an image sensor (42), etc., and outputs an image of the object obtained by the image sensor. The display (30) displays a through image which is based on the image that the camera module outputs. Furthermore, on the display, there is provided with the touch panel that is colorless and transparent such that a displaying content can be sighted. The detecting module detects a touch operation performed within the touch range of the touch panel. If and when the touch operation is detected, the performing module (24, S17) performs the predetermined process associated with the imaging such as a focus process, an imaging process, etc. Then, the setting module (24, S49) sets an ineffective region (74, 76) such that the ineffective region surrounds a periphery of an effective region within the touch range, for example.

According to the embodiment, in a case where the ineffective region is not displayed, since an image can be displayed with no change in its size, it is possible to prevent a visibility of the image displayed on the display from getting worse.

Another embodiment is the mobile terminal further comprising a key displaying module operable to display a processing key associated with the imaging in an effective region other than the ineffective region within the touch range if and when the ineffective region is set by the setting module.

In this embodiment, the key displaying module (24, S51) displays a key (64) for performing the above-described processing in the effective region excepting the ineffective region within the touch range if and when the ineffective region is set.

A still another embodiment is the mobile terminal wherein the processing key comprises an imaging key, and the predetermined processing associated with the imaging comprises an imaging process.

According to the above-described two embodiments, since the key is displayed in the effective region, an operability of the mobile terminal can be kept even if the ineffective region is set. Furthermore, the user can grasp rough position and range of the ineffective region by seeing the key that is displayed after the ineffective region is set.

A further embodiment is the mobile terminal further comprising a first storing module operable to store first coordinates based on the touch operation to the touch panel; and a second storing module operable to store second coordinates based on the touch operation to the touch panel after the first coordinates are stored by the first storing module, wherein the setting module sets an ineffective region based on the first coordinates stored by the first storing module and the second coordinates stored by the second storing module.

In the further embodiment, the first storing module (24, S87) stores a position that is firstly touched as the first coordinates, and the second storing module (24, S107) stores a position that is secondly touched as the second coordinates. The setting module sets the ineffective region such that the first coordinates and the second coordinates are rendered as apexes.

According to the further embodiment, the user can arbitrarily decide a size of the ineffective region.

A still further embodiment is the mobile terminal further comprising a counting module operable to count an operating time period until a touch operation is ended after the touch operation is detected by the detecting module; and a calculating module operable to calculate the first coordinates and the second coordinates based on the operating time period that is counted by the counting module, wherein the setting module sets the ineffective region based on the first coordinates and the second coordinates calculated by the calculating module.

In the still further embodiment, the counting module (24, S133, S135) counts a time period from the finger is touched to the touch panel to the finger is released from the touch panel as the operating time period. The calculating module (24, S139) calculates the first coordinates and the second coordinates by utilizing a linear function or the like. Then, the setting module sets the ineffective region based on the first coordinates and the second coordinates that is calculated.

According to the still further embodiment, it is possible for the user not only to set the ineffective region only by the touch operation but also to arbitrarily decide a size thereof.

A yet further embodiment is the mobile terminal further comprising an ineffective region displaying module operable to display the ineffective region that is set by the setting module.

In the yet further embodiment, the ineffective region displaying module (24, S161) displays the ineffective region so that the user can recognize the same by depicting slant lines in the ineffective region being set such that a through image can be permeated, by painting a color that is set in high permeability in the ineffective region, or by displaying a boundary line of a solid line, a dotted line or the like at a boundary between the ineffective region and the effective region.

According to the yet further embodiment, since the user can clearly recognize the position of the ineffective region, it is possible to further reduce an erroneous operation to the touch panel.

A further embodiment is the mobile terminal further comprising a changing module operable to change the ineffective region if and when a touch operation for changing the ineffective region that is being displayed by the ineffective region displaying module is performed.

In the further embodiment, the changing module (24, S167) changes a size of the ineffective region or a position that the ineffective region is being displayed based on the touch operation if and when the touch operation for changing the size of the ineffective region and/or the position that the ineffective region is to be displayed is performed.

According to the further embodiment, the user can arbitrarily change the size and/or displaying position of the ineffective region by performing a touch operation for changing after the ineffective region is set.

A still further embodiment is the mobile terminal wherein the setting module sets the ineffective region if and when the touch operation for setting the ineffective region is performed.

In the still further embodiment, a setting key (70) for setting the ineffective region is displayed on the display, for example. Then, the setting module sets the ineffective region based on the touch operation to the setting key.

A yet further embodiment is the mobile terminal further comprising a canceling module operable to cancel the ineffective region that is set by the setting module if and when the touch operation for canceling the ineffective region is performed.

In the yet further embodiment, a cancel key (72) for canceling the ineffective region is displayed on the display, for example. The canceling module (24, S61) cancels the ineffective region if and when the touch operation is performed to the cancel key.

According to the still further embodiment and the yet further embodiment, it is possible for the user to arbitrarily set or cancel the ineffective region.

The other embodiment is an ineffective region setting method in a mobile terminal (10) which comprises a camera module (40-44) operable to output an image of an object; a display (30) that displays an image output by the camera module; a touch panel (38) provided on the display; a detecting module (36) operable to detect a touch operation on the touch panel within a touch range; and a performing module (S17) operable to perform a predetermined process associated with an imaging if and when the touch operation is detected by the detecting module, comprising a step of setting (S49), inside the touch range, an ineffective region (74, 76) which makes the touch operation ineffective.

According to the other embodiment as well, in a case where the ineffective region is not displayed, since a through image can be displayed with no change in its size, it is also possible to prevent a visibility of the image displayed on the display from getting worse.

Although the present invention has been described and illustrated in detail, it is clearly understood that the same is by way of illustration and example only and is not to be taken by way of limitation, the spirit and scope of the present invention being limited only by the terms of the appended claims.

DESCRIPTION OF NUMERALS

10 denotes a mobile phone,
12 denotes an antenna,
14 denotes a wireless communication circuit,
24 denotes a processor,
26 denotes a key input device,
34 denotes a RAM,
36 denotes a touch panel control circuit,
38 denotes a touch panel
40 denotes a camera control circuit,
42 denotes an image sensor, and
44 denotes a focus lens.

The invention claimed is:

1. A mobile terminal which comprises:
a display configured to display a screen;
a touch panel configured to receive a touch operation to the screen; and
at least one processor configured to
detect a touch operation within a touch range of the touch panel, wherein the touch operation comprises a user depiction of a two-dimensional figure comprising a plurality of strokes, and,
inside the touch range, set an ineffective region based on the two-dimensional figure, wherein any touch operation within the ineffective region is ineffective.

2. The mobile terminal according to claim 1, wherein the display is configured to display the ineffective region.

3. The mobile terminal according to claim 2, wherein the at least one processor is configured to change the ineffective region, if and when a touch operation for changing the ineffective region is performed while the ineffective region is displayed.

4. The mobile terminal according to claim 3, wherein the touch operation for changing the ineffective region comprises a slide operation to move a boundary between the ineffective region and a region other than the ineffective region.

5. The mobile terminal according to claim 1, wherein the at least one processor is further configured to distinguish the ineffective region from a region, in the touch range, other than the ineffective region.

6. The mobile terminal according to claim 1, wherein the ineffective region has a rectangular shape.

7. The mobile terminal according to claim 6, wherein the rectangular shape is formed by surrounding the two-dimensional figure with a rectangle having a minimum area relative to all other possible rectangles that could surround the two-dimensional figure.

8. An ineffective region setting method in a mobile terminal which comprises a display configured to display a screen, and a touch panel configured to receive a touch operation to the screen, the method comprising:
detecting a touch operation within a touch range of the touch panel, wherein the touch operation comprises a user depiction of a two-dimensional figure comprising a plurality of strokes, and,
inside the touch range, setting an ineffective region based on the two-dimensional figure, wherein any touch operation within the ineffective region is ineffective.

9. A non-transitory computer readable storage medium comprising computer-executable instructions for operating a mobile terminal which comprises a display configured to display a screen, and a touch panel configured to receive a touch operation to the screen, a method executed by the computer-executable instructions comprising:
detecting a touch operation within a touch range of the touch panel, wherein the touch operation comprises a user depiction of a two-dimensional figure comprising a plurality of strokes, and,
inside the touch range, setting an ineffective region based on the two-dimensional figure, wherein any touch operation within the ineffective region is ineffective.

* * * * *